United States Patent [19]
Hope

[11] Patent Number: 5,921,051
[45] Date of Patent: Jul. 13, 1999

[54] SCREEN BAR CORNER REINFORCEMENT, A SCREEN FRAME INCLUDING SUCH A REINFORCEMENT AND METHODS OF MANUFACTURING THESE PRODUCTS

[75] Inventor: Robert Hope, Toronto, Canada

[73] Assignee: Bay Mills Limited, Ontario, Canada

[21] Appl. No.: 08/729,275

[22] Filed: Oct. 10, 1996

[51] Int. Cl.[6] .................................. E06B 3/00; E06B 5/00
[52] U.S. Cl. ....................... 52/656.7; 52/656.4; 52/656.5; 52/656.9; 52/742.13; 52/745.19; 52/745.15; 52/309.5; 52/309.7; 264/46.6; 264/46.7; 403/269; 403/402; 49/425
[58] Field of Search .............................. 52/656.7, 656.6, 52/656.9, 657, 742.13, 745.15, 745.16, 309.5, 309.7, 656.4, 656.5, 745.19; 264/46.6, 46.7; 403/265, 269, 401, 402, 403, 231; 49/425

[56] References Cited

U.S. PATENT DOCUMENTS

| | | |
|---|---|---|
| 1,852,866 | 4/1932 | Weitzel . |
| 2,717,667 | 9/1955 | Bancroft . |
| 2,762,430 | 9/1956 | Sylvan . |
| 2,989,788 | 6/1961 | Kessler . |
| 3,319,985 | 5/1967 | Arnett . |
| 3,321,885 | 5/1967 | Pratt . |
| 3,386,208 | 6/1968 | Banner .................................. 49/425 X |
| 3,606,419 | 9/1971 | Virkler et al. . |
| 3,729,868 | 5/1973 | Burum . |
| 3,885,371 | 5/1975 | Oakes . |
| 3,924,377 | 12/1975 | Gill . |
| 3,949,526 | 4/1976 | Sherlock et al. ................... 52/656.4 X |
| 4,006,513 | 2/1977 | Offterdinger ......................... 49/425 X |
| 4,030,160 | 6/1977 | Lambertz et al. .................... 49/425 X |
| 4,112,622 | 9/1978 | Stewart . |
| 4,128,934 | 12/1978 | Doring . |
| 4,169,304 | 10/1979 | Binder . |
| 4,342,144 | 8/1982 | Doguchi . |
| 4,502,260 | 3/1985 | Machler . |
| 4,570,406 | 2/1986 | DiFazio . |
| 4,580,380 | 4/1986 | Ballard . |
| 4,651,482 | 3/1987 | Borys . |
| 4,831,804 | 5/1989 | Sayer . |
| 4,873,741 | 10/1989 | Riegelman ............................ 49/425 X |
| 5,018,263 | 5/1991 | Stern . |
| 5,229,813 | 7/1993 | Cherian . |
| 5,292,190 | 3/1994 | Lautenschläger et al. . |
| 5,431,211 | 7/1995 | Guillemet . |
| 5,473,853 | 12/1995 | Guillemet et al. . |
| 5,485,705 | 1/1996 | Guillemet . |

FOREIGN PATENT DOCUMENTS

| | | |
|---|---|---|
| 2111918 | 6/1995 | Canada . |
| 1000616 | 8/1965 | United Kingdom . |

*Primary Examiner*—Robert Canfield
*Attorney, Agent, or Firm*—Fitzpatrick, Cella, Harper & Scinto

[57] ABSTRACT

A corner reinforcement for use in strengthening screen frames, for example, includes at least a first segment and a second segment of screen bar, each formed into a desired profile and each having a hollow interior portion, a reinforcing channel and a rigid reinforcing and structural material. The reinforcing channel has a first leg and a second leg arranged at approximately ninety degrees to the first leg. At least a portion of (i) the first leg of the channel is inserted through a first end of the first segment of the screen bar into and substantially spaced from a surface of the hollow interior portion thereof and (ii) the second leg is inserted through a first end of the second segment of the screen bar into and substantially spaced from a surface of the hollow portion thereof. The rigid reinforcing and structural material, formed from a foamed chemical, is inside at least one of (i) the hollow interior portion of the first segment for securing the inserted portion of the first leg of the reinforcing channel therewithin and (ii) the hollow interior portion of the second segment for securing the inserted portion of the second leg of the reinforcing channel therewithin. A wheel mechanism may be secured to one of the first and second legs of the reinforcing channel and encased in a decorative cover. Also disclosed is a screen frame including such corner reinforcements, as well as methods for making these products.

36 Claims, 7 Drawing Sheets

SCREEN BAR CORNER REINFORCEMENT, A SCREEN FRAME INCLUDING SUCH A REINFORCEMENT AND METHODS OF MANUFACTURING THESE PRODUCTS

BACKGROUND OF THE INVENTION

1. Field of the Invention

The present invention relates to a reinforcement for architectural or structural members such as frame sections or frames for screens, windows, doors, plastic or transparent panels, and the like, and more particularly, a screen bar corner reinforcement for use in strengthening, for example, screen door or window screen frames made of aluminum or sheet steel, a screen frame including such a reinforcement and methods of manufacturing these products.

2. Description of the Related Art

For convenience of discussion, the invention will be defined and described with particular reference to screen bar reinforcement for use in screen frames. Nevertheless, it will be understood that the invention is of general utility. Metal frames for window screens, screen doors (such as patio door screens) and the like are commonly made of four elongated frame members of uniform cross section connected together by corner assemblies. These frames are typically roll-formed from aluminum or sheet steel, although some may be extruded aluminum, and some of these frames are foam-filled to increase their strength. (For example, U.S. Pat. No. 3,885,371 shows a roll-formed sheet metal window frame filled with a rigid lightweight foamed material such as polyurethane.) Conventionally, to secure the screen material to the above-noted frames, peripheral edges of the screen are held within open grooves formed along inside edges of the frames using a stuffer strip known as spline.

These frames must have adequate strength as well as longitudinal and torsional rigidity, and the corners and joints must be rigid. These frames also must be durable and resist impact, damage and corrosion. Further, these frames must meet at least these practical requirements without excessive weight or cost.

In the case of large screen frames, particularly those used for patio door screens, prior corner connectors have been inadequate to sufficiently prevent twisting or bending of the frame. The twisting or bending of the frame out of its plane is particularly troublesome when the frame is removed from its support framing, for maintenance or cleaning, and then an attempt is made to replace it. The twisting or bending also presents problems during normal operation if the frame binds in its support tracks.

U.S. Pat. No. 4,570,406 shows an inexpensive, molded plastic corner connector key, which frictionally interconnects with the end portions of conventional screen frame members that can be square cut rather than mitered. The corner connector itself forms the exposed corner of the frame and thus is sized and shaped to match or blend with the ends of the frame members to form a visually uniform frame. The connector key has two rectangular, tubular-shaped legs arranged at right angles. The legs integrally fit within and are frictionally locked in face-to-face contact against the interior wall surfaces of the frame members.

U.S. Pat. No. 5,431,211, commonly assigned to the assignee of the subject application, shows a corner assembly for a window screen frame. The corner assembly has a pair of connector arms extending outwardly from a corner connector, generally at ninety degrees relative to each other. The connector arms are telescopically received in gripping relation within corresponding channels of side members of the frame.

U.S. Pat. No. 4,651,482 shows a corner piece for connecting adjacent hollow spacer members to form a spacer frame used in the construction of thermally insulated windows. The corner piece includes horizontal and vertical legs formed at a right angle. One end of each leg has a cutting edge. When the ends of each leg are inserted into a hollow spacer, which has internal partitions, the sharpened cutting edge is able to cut around the adjacent partition to enter the spacer. Sealant may be injected into the corner pieces and the spacers after assembly to seal off any gaps around the installed corner piece.

The foregoing corner connectors have a significant drawback, however, in that wedging the corner piece into the frame member can deform the frame member. This may result in jamming of the frame member during movement in its track or guide. Also, these current corner connectors concentrate loading of force at the points of contact, rather than distributing the loading. Such point loading results in local, permanent deformation of the light gauge metal frame members near the point loads. Once permanent deformation occurs, a clearance gap is formed, which allows movement (i.e., play) between the corner insert and the frame member. This play lessens the stiffness of the corner connection and the integrity of the entire frame assembly. Once clearance is established, and movement allowed, the connection is "worked" in operation and clearances increase further. To reduce the local deformation, thicker gauge frame members are required. This increases costs.

The initial clearances that are required between the corner insert and the frame members in order to insert current corners connectors also can reduce corner rigidity and torsional strength. A certain clearance is necessary to allow easy, hand assembly of the corner insert in the frame assembly. Although a snug fit is desired, practical stamping/molding and roll-forming tolerances allow play, which should be avoided, as discussed above. To reduce this play, and to prevent the corner connector from sliding out, some have proposed bending portions of the aluminum roll-formed section of the frame into pre-cut holes in the metal corner connector. This is known as staking.

Patio screen doors, in order to slide in their tracks, are usually provided with wheels mounted at the four corners of the door frame. For example, U.S. Pat. No. 3,729,868 shows a screen door having L-shaped corner connectors that include extensions which frictionally fit into interior spaces of the door frame. A sidewall of each connector is aligned with a rail of the door frame and includes a cutout that enables a guide roller or wheel to protrude therethrough. The roller is mounted to a bracket in a hollow interior space of the connector and pivots about a pin anchored in the connector. A leaf spring biases the roller into the rail of the door frame. The device in the '868 patent, while simplifying construction of the screen door, does not provide a frame having adequate strength and longitudinal and torsional rigidity, especially at the corners.

Accordingly, a need has arisen for a screen bar corner reinforcement and a screen frame including such a reinforcement, which overcome the drawbacks noted above with respect to conventional corner assemblies. There is an additional need for methods of making these products.

SUMMARY OF THE INVENTION

An object of this invention is to address the foregoing needs in the art and to provide a screen bar corner reinforcement for use in strengthening screen door or window screen frames, for example.

In one aspect, the screen bar corner reinforcement of this invention includes at least a first segment and a second segment of screen bar, each formed into a desired profile and each having a hollow interior portion, a reinforcing channel, and a rigid reinforcing and structural material. The reinforcing channel has a first leg and a second leg arranged preferably at approximately ninety degrees to the first leg. At least one of (i) a portion of the first leg of the reinforcing channel is inserted through a first end of the first segment of the screen bar into and substantially spaced from a surface of the hollow interior portion of the first segment and (ii) a portion of the second leg of the reinforcing channel is inserted through a first end of the second segment of the screen bar into and substantially spaced from a surface of the hollow portion of the second segment. The rigid reinforcing and structural material, formed from a foamed chemical, is inside at least one of (i) the hollow interior portion of the first segment for securing the inserted portion of the first leg of the reinforcing channel therewithin and (ii) the hollow interior portion of the inserted portion of the second segment for securing the inserted portion of the second leg of the reinforcing channel therewithin.

In another aspect, the present invention provides a method of making such a screen bar corner reinforcement for use in strengthening screen frames.

Another object of the present invention is to provide a screen frame including screen bar corner reinforcements. The frame includes first and second short segments of screen bar and first and second long segments of screen bar, each segment being formed into a desired profile and each having a hollow interior portion, four reinforcing channels, and a rigid reinforcing and structural material. Each of the reinforcing channels has a first leg and a second leg arranged at approximately ninety degrees to the first leg. At least one of (i) a portion of the first leg of a respective reinforcing channel is inserted through an end of each short segment of the screen bar into and substantially spaced from a surface of the hollow interior portion of the short segment and (ii) the second leg of a respective reinforcing channel is inserted through an end of each long segment of the screen bar into and substantially spaced from a surface of the hollow interior portion of the long segment. The rigid reinforcing and structural material, formed from a foamed chemical, is inside at least one of (i) the hollow interior portion of each short segment for securing respective inserted portions of the first legs of the reinforcing channels therewithin and (ii) the hollow interior portion of each long segment for securing respective inserted portions of the second legs of the reinforcing channels therewithin.

The present invention, in yet another aspect, provides a method of making a screen frame including such screen bar corner reinforcements.

In the present invention, the inserted portions of the reinforcing channel are sufficiently spaced from the surfaces of the hollow interior portions of the screen bar segments for allowing the foamed chemical, prior to curing, to pass between the inserted portions and the surfaces of the hollow interior portions.

In the present invention, each of the segments of the screen bar have a recess for securing screen, for example, therein and are made of a material selected from the group consisting of extruded aluminum, roll-formed aluminum, roll-formed sheet steel, extruded plastic and pultruded, glass-reinforced thermosetting resin. Also, the reinforcing channel can be a unitary piece preferably having either a substantially U-shaped cross section or a substantially Z-shaped cross section and has a bend at approximately ninety degrees to form the first and second legs. The reinforcing channel can be steel, preferably plated, or made of a high strength resin or plastic. The cross section of the reinforcing channel is significantly smaller than cross sections of the hollow interior portions of the screen bar segments for allowing the foamed chemical to pass between the reinforcing channel and a surface of the hollow interior portions.

In another aspect, a wheel mechanism can be secured to one of the legs of the reinforcing channel, the wheel mechanism including a wheel for being guided in a track of the screen frame. In one aspect, the center line of the wheel mechanism is aligned with the center line of the leg of the reinforcing channel to which the wheel mechanism is secured. A decorative cover, including side panels, can encase the wheel mechanism.

In the present invention, the screen bar segments can include injection apertures, with the structural material being, for example, polyurethane foaming material, having been injected into the segments through the injection apertures and solidified. In another aspect, the decorative cover can be enclosed and be provided with an injection aperture for the injection of such foaming material. Thus, the rigid reinforcing and structural material, formed from a foamed chemical, can be provided from inside regions of the decorative cover.

BRIEF DESCRIPTION OF THE DRAWINGS

Like reference numerals have been used for like or corresponding elements throughout the views.

DETAILED DESCRIPTION OF THE PREFERRED EMBODIMENTS

Figure 1A:
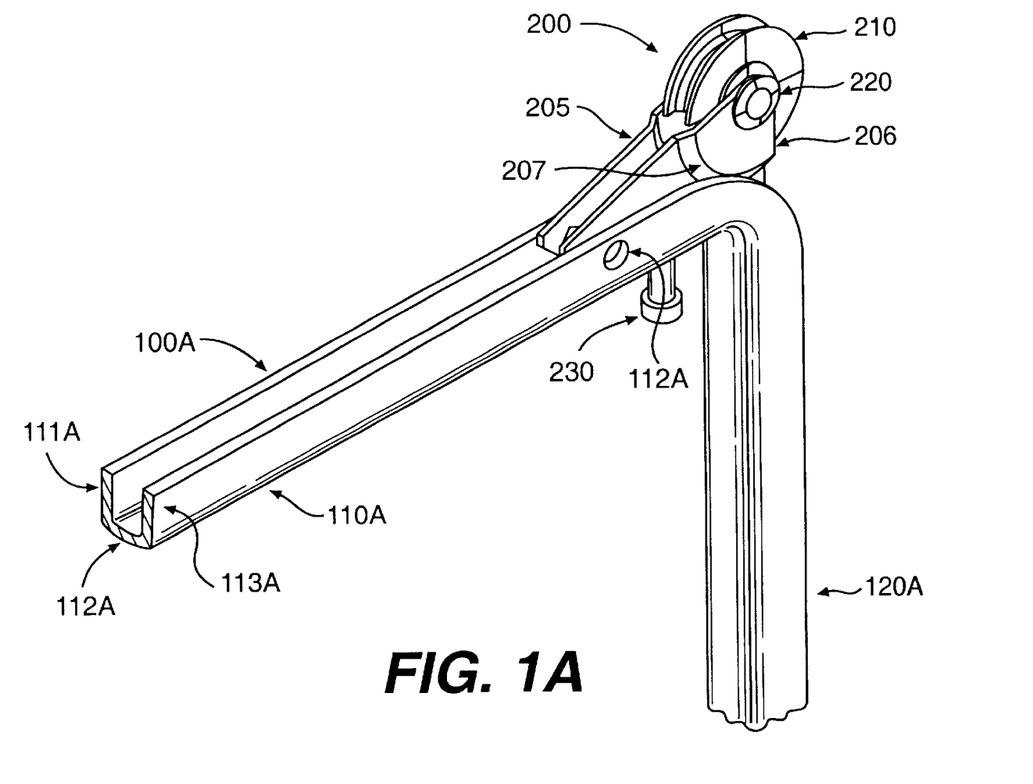
FIG. 1A schematically shows a portion of one embodiment of the reinforcing channel used in the screen bar corner reinforcement of the present invention, including an optional wheel assembly.

FIG. 1A schematically shows a portion of one embodiment of a reinforcing channel 100A used in the screen bar corner reinforcement of the present invention (which will be discussed in more detail below), including an optional wheel assembly 200. In this embodiment, the reinforcing channel 100A is preferably a unitary piece having a substantially U-shaped cross section and a bend preferably at approximately 90° to form a first leg 110A and a second leg 120A. The reinforcing channel 100A can be made of either steel, preferably plated, or a high strength resin or plastic, for example. If desired, other materials can be used, provided they result in the desired strength and rigidity achieved by the present invention. If made of plated steel, the reinforcing channel 100A can be roll-formed from flat stock. If made of high strength plastic, the reinforcing channel 100A can be molded or extruded. Representative dimensions for leg 110A, for example, of the reinforcing channel 100A are 0.500 inches in overall height for arms 111A and 113A, 0.400 inches in overall width for base 112A and 0.078 inches in thickness. However, these dimensions can be varied as desired.

Wheel assembly 200 includes a wheel 210 mounted to wheel assembly frame 205 by axle 220. The wheel assembly 200 may be of the type discussed in more detail in published Canadian patent application No. 2,111,918. Wheel assembly frame 205 includes a wheel well 206 formed by flared portion 207. Flared portion 207 flares outwardly from wheel assembly frame 205 by a sufficient amount to form wheel well 206. A set screw 230 adjusts the height of the wheel assembly 200 when wheel assembly 200 is secured in place using a fastener or pin 240 (best seen in FIG. 2A). Fastener 240 is inserted through a hole 112A drilled or otherwise formed in first leg 110A of reinforcing channel 100A. A center line of the wheel assembly 200 is aligned with a center line of first leg 110A of reinforcing channel 100A, to which it is attached.

Figure 1B:
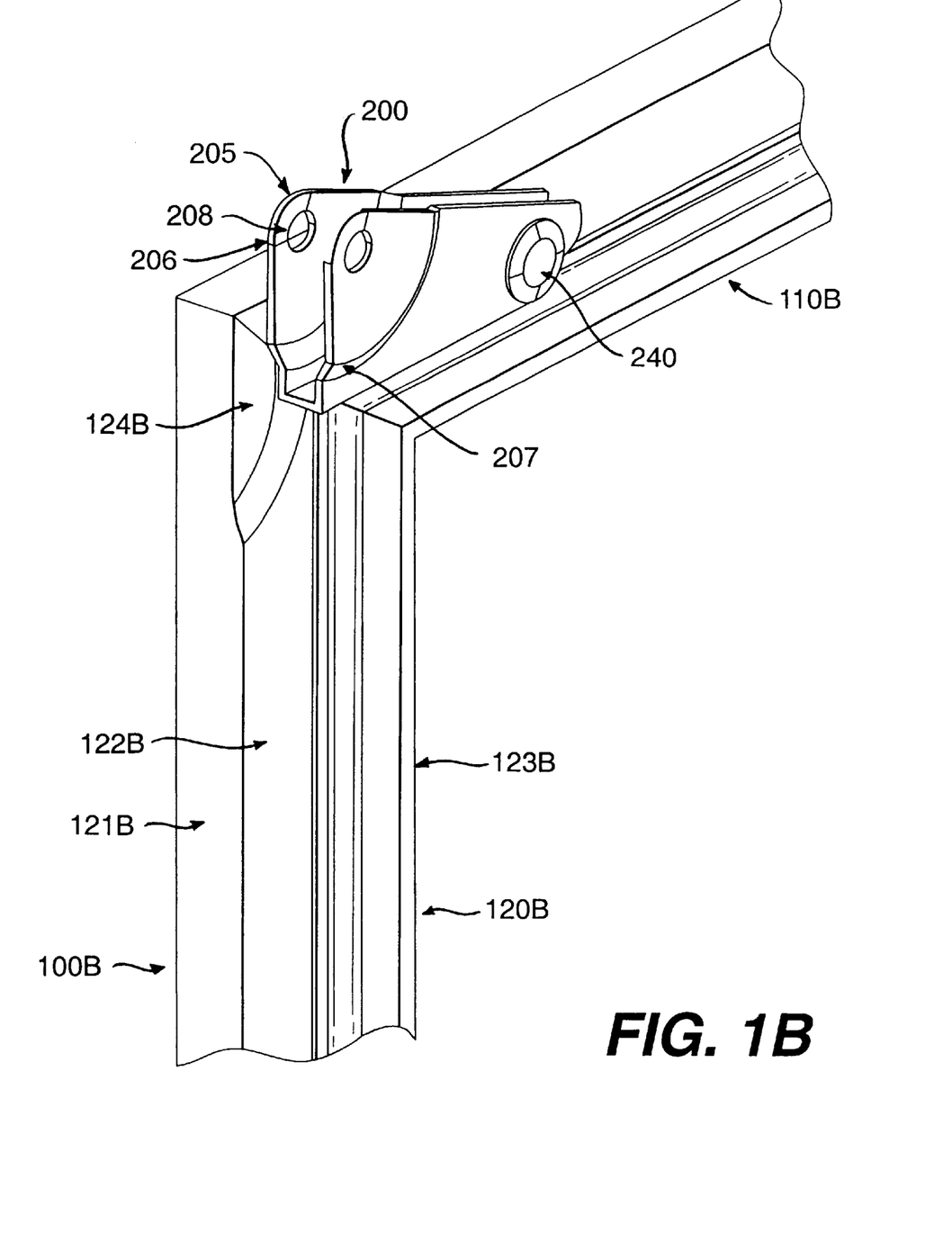
FIG. 1B schematically shows a portion of another embodiment of the reinforcing channel used in the screen bar corner reinforcement of the present invention, including an optional wheel assembly.

FIG. 1B schematically shows a portion of another embodiment of a reinforcing channel 100B used in the foam-filled screen bar corner reinforcement of the present invention (which will be discussed in more detail below), including a portion of optional wheel assembly 200. In this embodiment, the reinforcing channel 100B is preferably a unitary piece having a substantially "Z-shaped" cross section and a bend preferably at approximately 90° to form a first leg 110B and a second leg 120B. Although I use the term "Z-shaped", in this embodiment, reinforcing channel 100B has three substantially straight segments 121B, 122B and 123B each arranged at approximately 90° sequentially from the other. The reinforcing channel 100B can be made of either steel, preferably plated, or a high strength resin or plastic, for example. If desired, other materials can be used, provided they result in the desired strength and rigidity achieved by the present invention. If made of plated steel, the reinforcing channel 100B can be roll-formed or stamped from flat stock. If made of high strength plastic, reinforcing channel 100B can be molded or extruded.

The 90° bends of the reinforcing channel 100A or 100B will accommodate square or rectangular frames, for example. Nevertheless, other angles can be used for other geometries. In fact, if desired, the reinforcement of this invention could be circular, oval, elliptical or otherwise. Also, the legs of the reinforcing channels could be separate pieces if desired.

I am using the term "reinforcing channel" to refer to members having a substantially U-shaped cross section, as shown in FIG. 1A or a substantially Z-shaped cross section, as shown in FIG. 1B, as well as to include other geometries such as round, square, rectangular, and the like, whether completely enclosed or partially enclosed.

Representative dimensions for second leg 120B, for example, of reinforcing channel 100B are 0.375 inches in height for segment 121B, 0.750 inches in width for segment 122B and 0.375 inches in height for segment 123B. Second leg 120B is typically 0.750 inches in overall width, 0.500 inches in overall height and 0.100 inches in thickness. However, these dimensions can be varied as desired. Further, these dimensions will depend on the dimensions of the fillets and rounds generated when the reinforcing channel 100B is formed.

Wheel assembly 200 shown in FIG. 1B includes those features discussed above with respect to FIG. 1A. FIG. 1B further shows holes 208 formed in wheel well 206 of wheel assembly frame 205 for receiving axle 220 (not shown). Although not shown in FIG. 1B, set screw 230 is provided for adjusting the height of the wheel assembly 200 when wheel assembly 200 is secured in place using a fastener or pin 240.

Since, in this embodiment, wheel assembly 200 includes wheel well 206 formed by flared portion 207, segment 121B of reinforcing channel 100B must be stamped or machined as shown by region 124B in FIG. 1B. Region 124B is recessed sufficiently to accommodate wheel well 206 of wheel assembly 200. Of course, one having ordinary skill in the art recognizes that if wheel assembly 200 does not include flared portion 207, then it is not necessary to provide recessed portion 124B in reinforcing channel 100B. An advantage provided by this embodiment is that wheel assembly 200 is constrained on only one side, by segment 121B, rather than being constrained by the two sides of reinforcing channel 100A shown in FIG. 1A. This assists in locating and mounting wheel assembly 200.

Figure 1C:
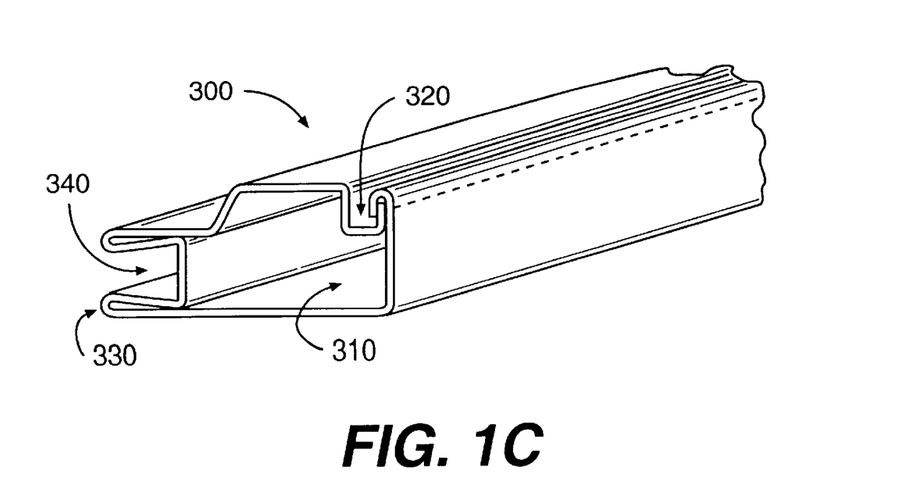
FIG. 1C schematically shows a portion of the roll-formed screen bar used in the present invention, prior to being injected with a rigid reinforcing and structural material, formed from a foamed chemical, and prior to insertion of the reinforcing channel shown in FIG. 1A or FIG. 1B.

FIG. 1C schematically shows a portion of the roll-formed screen bar 300 used in the present invention, prior to being injected with a rigid reinforcing and structural material, formed from a foamed chemical, and prior to insertion of the reinforcing channel 100A shown in FIG. 1A or reinforcing channel 100B shown in FIG. 1B. As discussed above, for ease of discussion, the invention will be defined and described with particular reference to screen bar for use in screen frames. Nevertheless, it will be understood that the invention is of general utility such as for frame sections or frames for windows, doors, plastic or transparent panels and like architectural or structural members. The screen bar 300 has a hollow interior portion 310 and a groove 320 for receiving, for example, screen (not shown) therein. Conventionally, the screen is secured in groove 320 using a stuffer strip known as spline. Of course, other equivalent techniques may be used, if desired. The screen bar 300 also includes bent portions 330, which are bent 180°, in order to form a guide trough 340 for sliding along a track of a screen frame, which will be discussed in more detail below. Screen bar 300 is typically rolled-formed from aluminum or sheet steel, although it also may be extruded from aluminum. Further, it may be extruded plastic or pultruded, glass-reinforced thermosetting resin, for example.

Figure 2A:
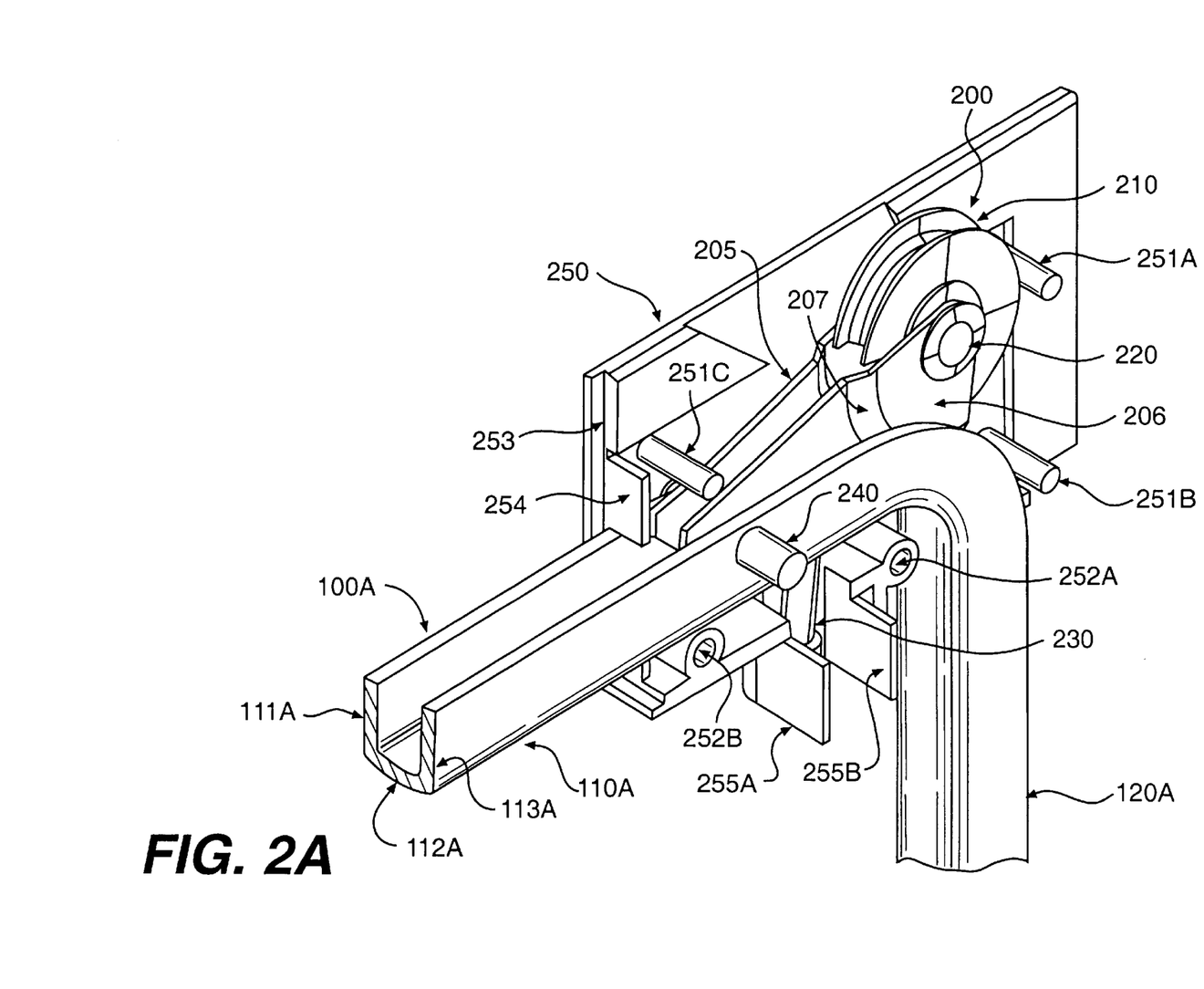
FIG. 2A shows, as one embodiment of the present invention, the reinforcing channel and optional wheel assembly of FIG. 1A with a portion of the decorative cover for covering the wheel assembly.
Figure 2B:
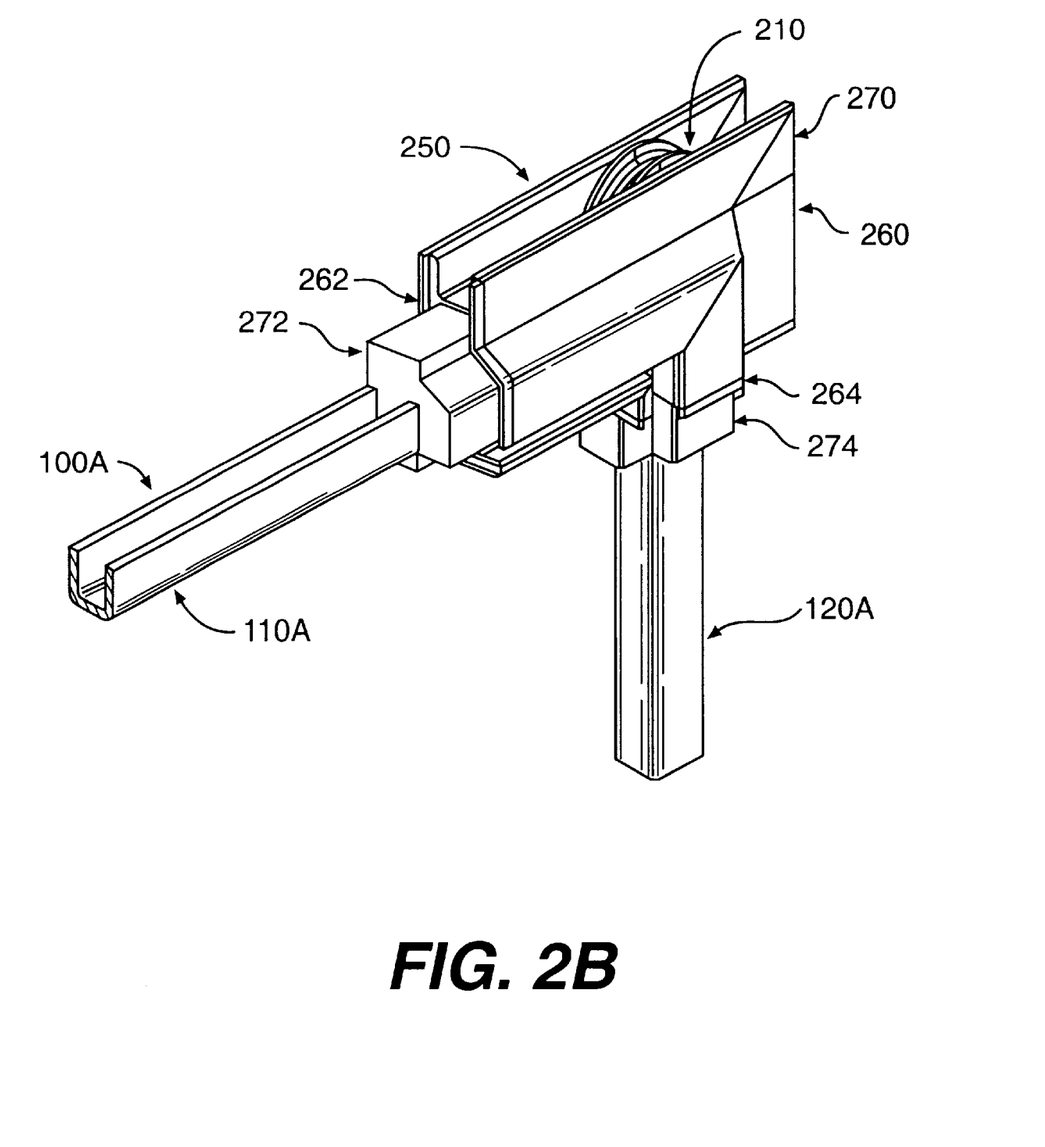
FIG. 2B shows the reinforcing channel of FIG. 2A with the decorative cover, and connector caps that can be provided, in place.

FIG. 2A shows, as one embodiment of the present invention, the reinforcing channel 100A and optional wheel assembly 200 of FIG. 1A assembled to a decorative side panel 250, which, together with a mating decorative side panel 260 shown in FIG. 2B, forms a decorative cover 270 for covering the wheel assembly 200. Side panel 250 includes pins 251A through 251C and receptacles 252A and 252B for securing mating decorative side panel 260 shown in FIG. 2B. Side panel 260 includes corresponding pins and receptacles (not shown). Side panel 250 also includes partial blinds 255A and 255B for hiding set screw 230 and a recess 253 for receiving screen bar 300 as will be apparent from the discussion below. If desired, side panel 250 also can include a stop 254 for reasons that also will be apparent from the discussion below. Side panel 250 and side panel 260 are molded or otherwise readily formed from resin or plastic such as polypropylene, vinyl, painted ABS (acrylonitrile butadiene styrene) or ASA (acrylonitrile styrene acrylate). Therefore, these side panels can be formed into a variety of shapes and configurations as is desired.

Although the reinforcing channel 100A of FIG. 1A is discussed herein with respect to this embodiment of the present invention, one having ordinary skill in the art would recognize that reinforcing channel 100B of FIG. 1B and other configurations discussed above are equally applicable, and can be readily received by decorative side panel 250 and decorative side panel 260, with only slight modifications to the side panels. Therefore, for the sake of brevity only, decorative side panels 250 and 260 will be discussed with reference to reinforcing channel 100A. This discussion, however, does not limit the invention to the use of reinforcing channel 100A. Rather, reinforcing channel 100B or other configurations within the concepts of the present invention can be used as desired.

FIG. 2B shows the reinforcing channel 100A of FIG. 2A, for example, with decorative cover 270 in place. As discussed above, decorative cover 270 has been formed by joining decorative side panel 260 to decorative side panel 250 using corresponding pins 251A through 251C and receptacles 252A and 252B.

FIG. 2B also shows connector caps 272 and 274 that can be used. If utilized, these connector caps can be partially inserted into respective ends 262 and 264 of decorative cover 270 for assisting in securing screen bar 300 in recess 253 of decorative cover 270. FIG. 2B shows connector caps 272 and 274 as being tightly secured to legs ll0A and 120A of reinforcing channel 100A. However, these connectors caps may just as well be hollow connectors and not tightly secured to the legs 110A and 120A of reinforcing 100A, for the reasons that will be discussed in more detail below. Also, connector caps 272 and 274 can be omitted altogether, in which case, the screen bar 300 is secured directly to decorative cover 270.

Figure 3:
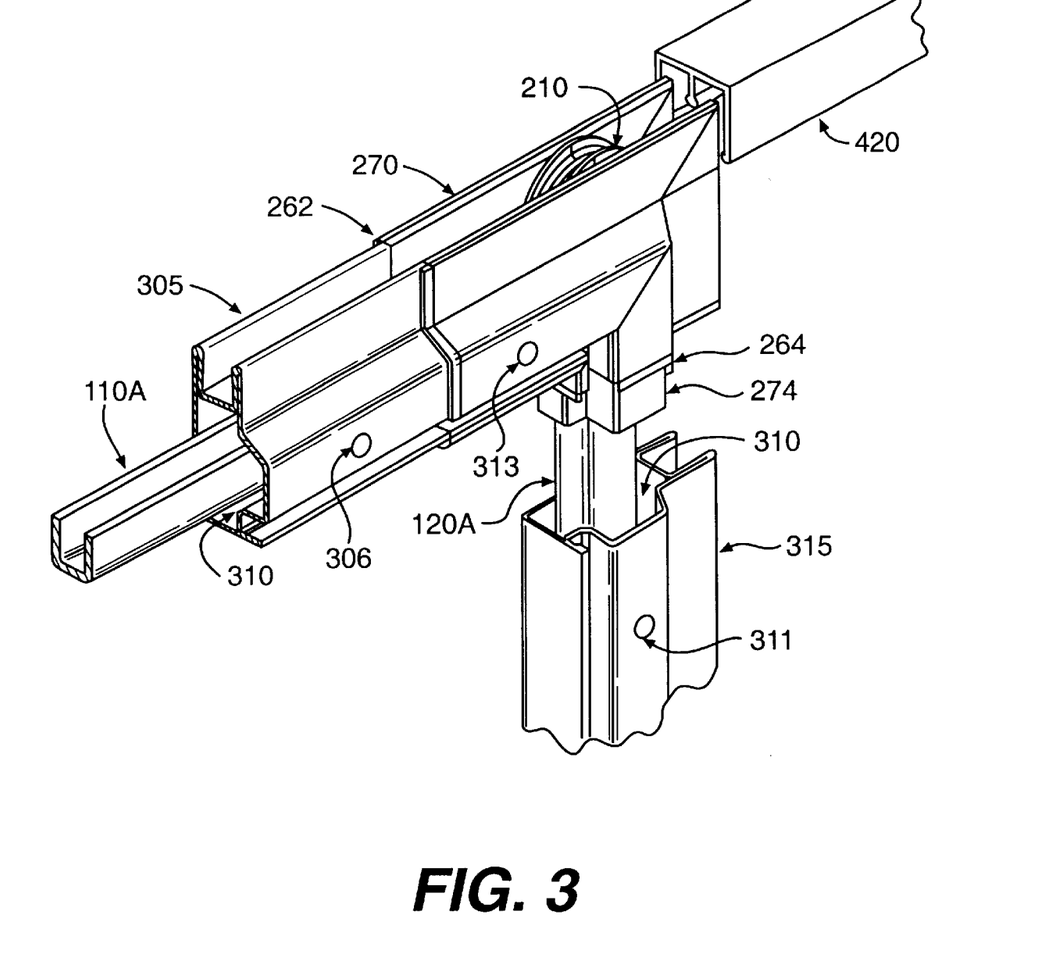
FIG. 3 shows a partially assembled view of one embodiment of the corner reinforcement of the present invention.

FIG. 3 shows a partially assembled view of one embodiment of the corner reinforcement of the present invention, in conjunction with the reinforcing channel 100A of FIG. 2B, discussed above, installed in a track 420 for guiding the screen frame. FIG. 3 shows the joining of a first segment 305 of screen bar to one end 262 of decorative cover 270. A second segment 315 of screen bar is secured to another end 264 of decorative cover 270. If utilized, connector caps 272 and 274 assist in securing screen bar segment 305 and screen bar segment 315 to decorative cover 270, respectively. If connector caps 272 and 274 are not utilized, then first screen bar segment 305 and second screen bar segment 315 are secured in respective recesses (for example, 262 shown in FIG. 2B) of decorative cover 270. FIG. 3 also shows that first screen bar segment 305 can be provided with an insertion opening 306, while second screen bar segment 310 can be provided with an insertion opening 311. These openings will be discussed in more detail below.

If desired, decorative cover 270 can be formed as a sealed unit when decorative side panels 250 and 260 are joined. In this instance, decorative cover 270 has a closed, hollow interior that is encased around wheel 210 and wheel assembly 205. Stop 254 of decorative side panel 250 assists in this encasing. In this configuration, decorative cover 270 also can be provided with a corresponding insertion opening 313 for reasons that will be apparent from the discussion below.

FIG. 3 shows that a portion of the first leg 110A of the reinforcing channel 100A is inserted through a first end of the first screen bar segment 305 into and substantially spaced from a surface of the hollow interior portion 310 of the first screen bar segment 305 and a portion of the second leg 120A of the reinforcing channel 100A is inserted through a first end of the second screen bar segment 315 into and substantially spaced from the hollow interior portion 310 of the second segment. Of course, one having ordinary skill in the art recognizes that if the reinforcing channel 100A, for example, is made of separate pieces, rather than being unitary, then one or the other of the legs 110A/120A can be installed in the respective screen bar segments.

FIG. 3 shows that the inserted portions of the reinforcing channel 100A are sufficiently spaced from the surfaces of the hollow interior portions of the screen bar segments 305 and 315 for allowing foamed chemical, prior to curing, to pass between the inserted portions and the surfaces of the hollow interior portions. This arrangement will be discussed in more detail below.

A probe or equivalent instrument can be inserted in insertion opening 306 of first screen bar segment 305 and insertion opening 311 of second screen bar segment 315 to inject a foamed material, such as polyurethane, urea formaldehyde or styrene, for example. Other equivalent materials could be used. In this manner, the foamed material can be injected in the respective insertion openings inside the hollow interior portion of the first screen bar segment 305 for securing the inserted portion of the first leg 110A of the reinforcing channel 100A therewithin and/or inside the hollow interior portion 310 of the second screen bar segment 315 for securing the inserted portion of the second leg 120A of the reinforcing channel 100A therewithin. Of course, if desired, the foamed material can be injected in one or the other of the legs independently. It should be noted that the foamed material, upon curing, not only secures, but also orients the respective legs within the corresponding segments.

Rather than using insertion openings 306 and 311, the foamed material could be injected through guide through 340. Further, if desired, the foamed material can be injected in insertion opening 313 in decorative cover 270 as an additional reinforcement to the corner. If connector caps 272 and 274 are omitted, or hollow connectors are utilized in conjunction with an otherwise sealed decorative cover 270, then the foamed material could be injected into the decorative cover 270 directly from the screen bar segments 305 and 315. It is important that the foamed material not interfere with either the wheel 210 or the wheel assembly 205. Therefore, these elements must be encased or sufficiently protected, as discussed above.

The foamed material should have desirable characteristics for use in this invention. For example, it should have good adhesion properties so that it may adhere to metal surfaces, such as the reinforcing channel 100A and the screen bar segments 305 and 315. Also it could potentially, but not necessarily, have the ability to adhere to the decorative cover 270. The foamed material is initially a liquid and can be injected at a pressure anywhere between 50 to 4000 psi depending on the type of injector used. Although under this pressure, the foamed material is injected, almost poured into the screen bar segments, since it flows with a low viscosity. I have found that the liquid stops flowing after about 15 seconds, it foams, and then the foam expands until it reaches the limits of the reinforcing channel or the screen bar. In this regard, the reinforcing channel also could be provided with holes to assist the foamed material in reaching narrow spaces between the reinforcing channel and the screen bar. I have found that it is best that the foamed material expand, but not with a tremendous driving force. It may expand at a pressure of approximately 15 psi. Once injected, the foam typically expands until it hits the internal walls of the screen bar. Slight bulging of the screen bar may occur. Therefore, vent holes can be provided in the screen bar as necessary. The foamed material should be capable of withstanding temperatures between −40° C. and 70° C. Also, the foamed material should not contract upon curing.

I have found that the present invention provides sufficient strength and rigidity without "foaming" the decorative cover. Nevertheless, some may desire that this portion of the corner reinforcement have a consistent "sound" and "feel" as the remaining corner reinforcement. Therefore, I have provided for this aesthetic requirement, as will be discussed in more detail below. Decorative plugs can be installed in the insertion openings 306, 311 and 313, as necessary, once the respective portions have been "foamed".

This invention provides many options, depending upon the configuration of the decorative cover 270. In one aspect, if the decorative cover has a "pass-through" design, foamed material can be injected into one screen bar segment and pass through the decorative cover 270 into the other screen bar segment. Thus, the foamed material can travel around the corner of the corner reinforcement to encapsulate both ends of the reinforcing channel. In another aspect, if the connector caps 272 and 274 are utilized, the decorative cover 270 is isolated from the foamed material, since the connector caps 272 and 274 stop the penetration of the foamed material into the decorative cover 270. In turn, the decorative cover 270 can remain hollow or can be injected directly with the foamed material through injection opening 313 or otherwise. It is also then necessary to foam the screen bar segments individually to encapsulate the legs of the reinforcement individually, in the manner discussed above.

In a variation, the corner reinforcement itself could provide the required injection port and passage-ways, to direct the injected foam to the necessary portions of the corner reinforcement. In this arrangement, the decorative cover 270 would have a modified "pass-through" design with suitable passage-ways so that the foaming material could be injected directly into the decorative cover 270 without interfering with either the wheel 210 or the wheel assembly 205. In this design, no insertion openings would be required in the sides of the screen bar or the decorative cover 270. Rather, the foaming material could be injected from the ends of and through the passage-ways of the decorative cover 270 along the legs of the reinforcement. The ends of the decorative cover 270 would then be capped unobtrusively and the wheel assembly 200 secured. In this design, there would be no visible indication that the corner reinforcement has been "foamed".

Standard patio screen doors have dimensions on the order of thirty-four to thirty-six inches in width and seventy-four inches in height. I prefer that the legs of the corner reinforcement extend into the screen bar with a length of each leg being between 4 to 12 inches. It is more preferred to use legs 6 inches in length. Legs longer than 12 inches can be used, but cost then becomes a factor. If, however, the legs are made too short, I have found that the cured, foamed material cannot handle the loading, since the lever force is high, whereas the longer dimensions transmit the loads across a greater distance. Thus, more distributive loading is achieved with longer leg lengths.

It is known that, for a bar supported at one end (a cantilevered bar), a bar 3 feet in length will bend by an amount relative to a bar (made of identical material) 2 feet in length by $3^3/2^3$. Thus, deflection of the cantilevered bar increases significantly with length. I determine an optimum length of the legs of the corner reinforcement based in part on this relationship. By increasing the length of the legs, I shorten the length of any unsupported (unreinforced) profile, by the cubic relationship noted above.

Figure 4:
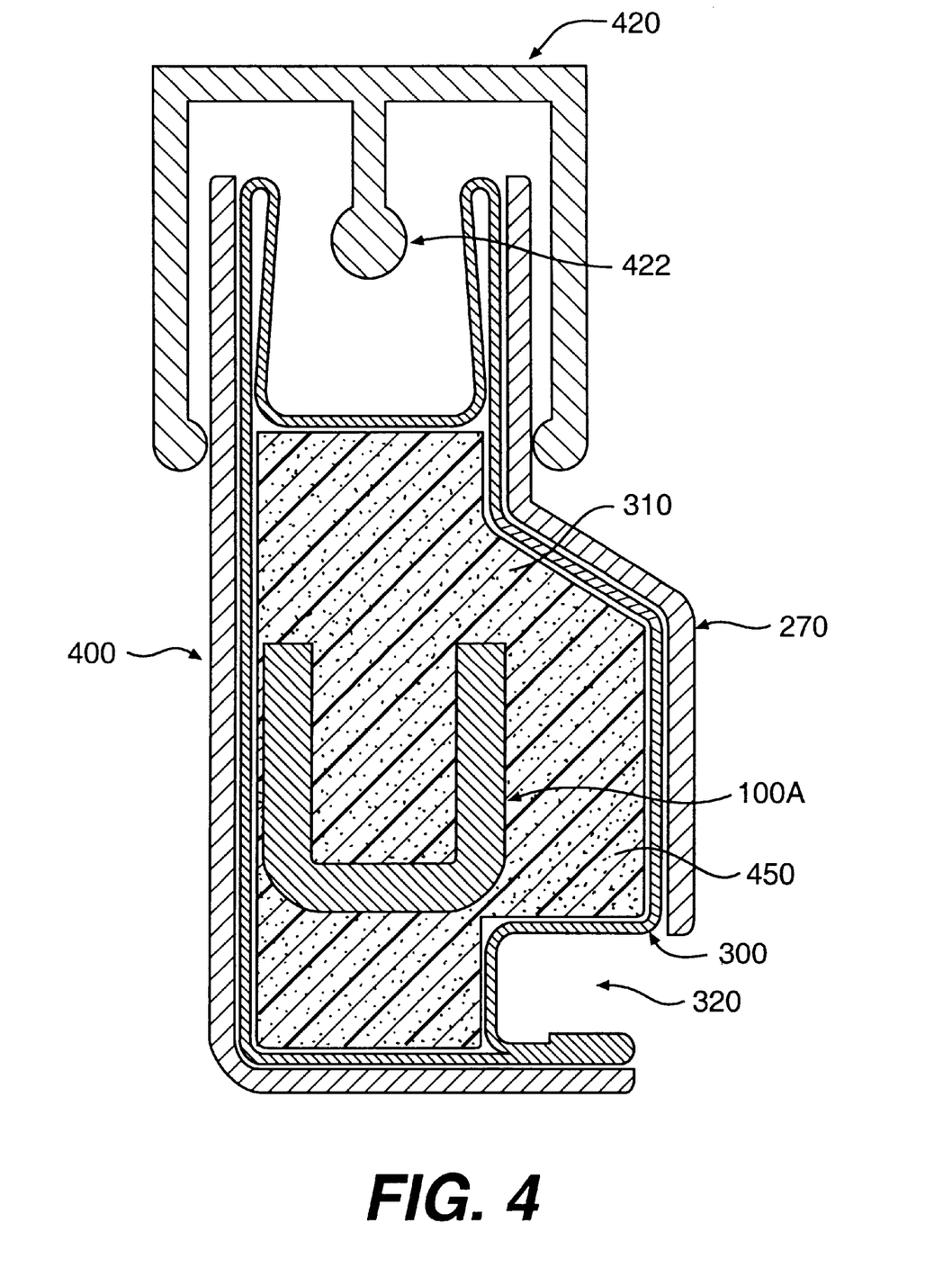
FIG. 4 shows a cross-sectional view of one embodiment of the corner reinforcement of the present invention, taken generally along line IV—IV of FIG. 5.
Figure 5:
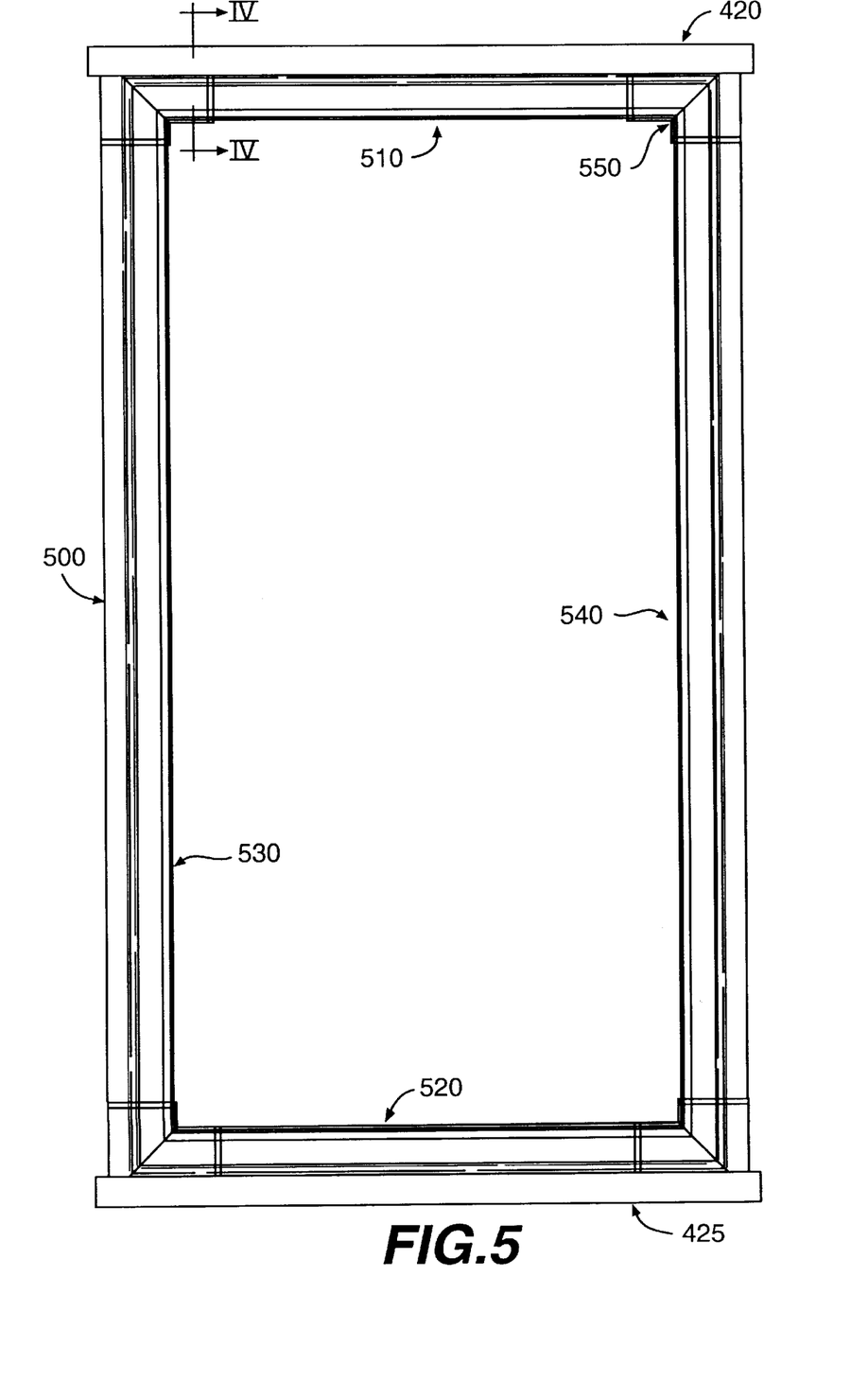
FIG. 5 shows an assembled view of a screen frame including the screen bar corner reinforcements of the present invention.

FIG. 4 shows a cross-sectional view of one embodiment of the corner reinforcement of the present invention, taken generally along line IV—IV of FIG. 5. FIG. 4 shows a portion of screen frame assembly 400 that includes a reinforcing channel 100A, in this embodiment, which is secured and oriented within rigid reinforcing and structural material 450, such as solidified polyurethane foam. Screen frame assembly 400 is guided in track 420 along guide 422. In FIG. 4, the foamed material has been injected into decorative cover 270. FIG. 4 shows that reinforcing channel 100A is substantially spaced from the surfaces of hollow interior portion 310 of the screen bar segment 300. In fact, a cross section of the reinforcing channel 100A is significantly smaller than a cross section of the hollow interior portion 310 of the screen bar segment 300 for allowing the foamed chemical to pass between the reinforcing channel and the surface of the hollow interior portions. This arrangement, upon curing of the foamed chemical, assists in distributing the loading along the corner reinforcement. Of course, it is acceptable if the reinforcing channel 100A contacts a side wall of the screen bar segment 300, since this will not detract from the distributed loading. Nevertheless, it is important that the inserted portions of the reinforcing channel be sufficiently spaced from the surfaces of the hollow interior portions of the screen bar segments for allowing passage of the foamed material, prior to curing.

FIG. 5 shows a screen frame 500 that includes the screen bar corner reinforcements of the present invention. The screen frame 500 is guided in tracks 420 and 425. FIG. 5 shows first and second short screen bar segments 510 and 520 and first and second long screen bar segments 530 and 540, each of which is formed into a desired profile and each has a hollow interior portion. In this embodiment, each of the four corners has been reinforced using the corner reinforcements of the present invention. Notably, the screen frame 500 utilizes four reinforcing channels 100A or 100B, each having a first leg and a second leg arranged at approximately 90° to the first leg. A portion of the first leg of a respective reinforcing channel is inserted through an end of short screen bar segment 510/520 into and substantially spaced from a surface of the hollow interior portion of the short segment and a portion of the second leg of a respective reinforcing channel is inserted through an end of each long screen bar segment 530/540 into and substantially spaced from a surface of the hollow interior portion of the long segment. A rigid reinforcing and structural material 450 (as shown in FIG. 4), formed from a foamed chemical, is inside the hollow interior portion of each short segment for securing and orienting respective inserted portions of the first legs of the reinforcing channels therewithin and the hollow interior portion of each long segment for securing and orienting respective inserted portions of the second legs of the reinforcing channels therewithin.

In making a screen frame 500 including such screen bar corner reinforcements, first and second short segments of screen bar and first and second long segments of screen bar are provided, each segment being formed into a desired profile and each having a hollow interior portion. Four reinforcing channels 100A or 100B are also provided, each having a first leg and a second leg arranged at approximately 90° to the first leg. A portion of the first leg of a respective reinforcing channel 100A or 100B is inserted through an end of a short segment 510/520 of the screen bar into and substantially spaced from a surface of the hollow interior portion of the short segment 510/520. A portion of the second leg of a respective reinforcing channel 100A or 100B is inserted through an end of a long segment 530/540 of the screen bar into and substantially spaced from a surface of the hollow interior portion of the long segment 530/540. As discussed above, the inserted portions of the reinforcing channel 100A or 100B should be sufficiently spaced from the surfaces of the hollow interior portions of the screen bar segments for allowing passage of the foamed material, prior to curing.

Although it is preferred to reinforce both long and short segments of each of the four corners, it is recognized that not all four corners need be reinforced, and not all segments of the corners need be reinforced, if this is desired for a particular application. Rather, individual legs or particular corners could be reinforced, as desired, using the concepts of the present invention.

It is preferred to use a corner reinforcement that allows square cut ends, as has been shown herein, since less screen bar material is required and the corner reinforcement can be designed to allow a close fitting connection between the corner reinforcement and the decorative cover, for example. However, if desired, corner reinforcements allowing miter (45°) cuts can be used.

After the reinforcing channel 100A or 100B is inserted into respective screen bar segments, the members are clamped rigid. The entire assembly (four corners) can be clamped together, or the corners can be assembled singularly and in pairs.

Preferably, a metered amount of premixed liquid polyurethane foam (or other suitable foaming material or equivalent) is injected through an injection opening into the interior of the corner reinforcement. I prefer to use foaming material sold under the tradename Vultafoam and supplied by General Latex Canada Inc. This material becomes rigid after approximately ninety seconds. However, any equivalent foaming material, which cures after 5 seconds or up to 5 minutes can be used as desired. This injection can be performed using any of the various techniques discussed above, such as through the screen bar segments, alone, or in combination with the decorative cover, or solely through the decorative cover, either from the side, or end-wise. Sufficient chemical is injected to result in orientation and encapsulation of the insert, after the polyurethane (or other foaming material) has fully expanded and cured. I prefer a density of about 6 lbs/ft$^3$ after the material becomes rigid. This density should be above 2.5 lbs/ft$^3$ to avoid excessive shrinkage at low temperatures. To substantially fill each short segment, about 28 grams of material would be required, whereas to substantially fill each long segment, about 70 grams of material would be required. Of course, it is recognized that it is not necessary to substantially fill these segments in order to achieve the desired results of this invention. Nevertheless, if desired, the encapsulation can substantially fill most clearances between the reinforcing channel 100A or 100B and the interior of the screen bar by passing through the spacing the inserted legs of the corner reinforcement and the screen bar segments. This thus eliminates any initial play in the corner reinforcement.

As discussed above, the rigidity of the corner is enhanced by using reinforcing channels 100A or 100B that are as long as practical. By extending the corner reinforcements deeper into the screen bar segments, the loading at the corner is distributed over a larger area, thus reducing localized stresses, making the corner reinforcement stronger and stiffer. Furthermore, unreinforced spans are reduced or eliminated.

Subsequent to the removal of the foam injector from the port, any excess foam is wiped clean from the frame and an aesthetic plug can be inserted into the injection opening. After the foam has cured in the corner assembly, a rigid connection and distributed loading results, since the cured, foamed material intimately contacts all loading areas. As the foam expands in the clearance gaps, the foam exerts a distributed force on these loading areas, in effect preloading the connection, and increasing stiffness further.

I have found that the screen bar corner reinforcement of this invention and screen frames made using such corner reinforcements have many advantages over conventional arrangements. In particular, the screen bar corner reinforcement of this invention results in a stiffer, stronger "screen bar" for use in screen or other frames. This is true both in bending and torsion. I believe that the shear strength of the screen bar is also increased, thus improving mechanical properties overall. This improvement in mechanical properties allows for a reduction in frame gauge (thickness) and thus lowers cost. The cost of adding the rigid foam is less than the savings from the gauge reduction to yield a net cost reduction. Thus, this invention results in cost reduction with significantly increased performance.

There are additional benefits. This invention provides increased dent resistance and increased localized buckling resistance of the typically roll-foamed frame material. Also, locking of the screen bar joint or seam is less critical, since the expanded rigid foam improves overall integrity of the profile and increases torsional stiffness and strength. Also, the harder, thinner typically roll-foamed material allows for tighter bends on the profile without stressing and cracking any paint on the surface. This improves aesthetics, and corrosion resistance of the product when the screen frame is made of steel. Further, the final assembly has significantly enhanced consumer appeal. The "feel" of the final assembly is denser and less "tinny" than conventional assemblies. This means that the sound of a patio screen door, for example, utilizing this invention is quieter during rolling as it is opened and closed than when conventional screen doors are used.

The scope of the invention is not limited by the discussion above, but only by each of the following claims, which should be interpreted as broadly as possible to encompass all modifications and equivalent structures without encompassing the prior art or invalidating the claim.

I claim:

1. A screen bar corner reinforcement for use in strengthening screen frames, said reinforcement comprising:

at least a first segment and a second segment of screen bar, each formed into a desired profile and each having a hollow interior portion;

a reinforcing channel having a first leg and a second leg arranged at approximately ninety degrees to the first leg, at least one of (i) a portion of the first leg of the reinforcing channel being inserted through a first end of the first segment of the screen bar into and substantially spaced from all surfaces of the hollow interior portion of the first segment and (ii) a portion of the second leg of the reinforcing channel being inserted through a first end of the second segment of the screen bar into and substantially spaced from all surfaces of the hollow interior portion of the second segment; and a rigid reinforcing and structural material, formed from a foamed chemical, selectively provided inside at least a portion of at least one of (i) the hollow interior portion of the first segment for securing the inserted portion of the first leg of the reinforcing channel therewithin and (ii) the hollow interior portion of the second segment for securing the inserted portion of the second leg of the reinforcing channel therewithin, wherein a respective inserted portion of the reinforcing channel is sufficiently spaced from the surfaces of the hollow interior portion of a corresponding screen bar segment to allow the foamed chemical, prior to curing, to pass between the inserted portion and the surfaces of the hollow interior portion.

2. A reinforcement according to claim 1, in which each of the first and second segments of screen bar have a recess for securing screen therein and are made of a material selected from the group consisting of extruded aluminum, roll-formed aluminum, roll-formed sheet steel, extruded plastic and pultruded, glass-reinforced thermosetting resin.

3. A reinforcement according to claim 1, in which the reinforcing channel is a unitary piece having a bend of approximately ninety degrees to form the first and second legs and a cross section of one of substantially U-shape and substantially Z-shape.

4. A reinforcement according to claim 1, in which the reinforcing channel is one of plated steel and high strength plastic.

5. A reinforcement according to claim 1, in which a cross section of the reinforcing channel is significantly smaller than a cross section of the hollow interior portions of the first and second segments of screen bar for allowing the foamed chemical, prior to curing, to pass between the reinforcing channel and surfaces of the hollow interior portions.

6. A reinforcement according to claim 1, further comprising a wheel mechanism secured to one of the first and second legs of the reinforcing channel, the wheel mechanism including a wheel for being guided in a track of the screen frame.

7. A reinforcement according to claim 6, in which the center line of the wheel mechanism is aligned with the center line of the one of the first and second legs of the reinforcing channel to which the wheel mechanism is secured.

8. A reinforcement according to claim 6, further comprising decorative side panels for enclosing the wheel mechanism.

9. A reinforcement according to claim 1, in which each of the first and second segments of screen bar include injection apertures, and the structural material is polyurethane foaming material having been injected into the first and second segments through the injection apertures and solidified.

10. A screen frame including screen bar corner reinforcements, said frame comprising:

first and second short segments of screen bar and first and second long segments of screen bar, each segment being formed into a desired profile and each having a hollow interior portion;

four reinforcing channels, each having a first leg and a second leg arranged at approximately ninety degrees to the first leg, at least one of (i) a portion of the first leg of a respective reinforcing channel being inserted through an end of a short segment of the screen bar into and substantially spaced from all surfaces of the hollow interior portion of the short segment and (ii) a portion of the second leg of a respective reinforcing channel being inserted through an end of a long segment of the screen bar into and substantially spaced from all surfaces of the hollow interior portion of the long segment; and a rigid reinforcing and structural material, formed from a foamed chemical, selectively provided inside at least a portion of at least one of (i) the hollow interior portion of each short segment for securing respective inserted portions of the first legs of the reinforcing channels therewithin and (ii) the hollow interior portion of each long segment for securing respective inserted portion of the second legs of the reinforcing channels therewithin, wherein a respective inserted portion of the reinforcing channel is sufficiently spaced from the surfaces of the hollow interior portion of a respective screen bar segment to allow the foamed chemical, prior to curing, to pass between the inserted portion and the surfaces of the hollow interior portion.

11. A frame according to claim 10, in which each of the segments of screen bar have a recess for securing screen therein and are made of a material selected from the group consisting of extruded aluminum, roll-formed aluminum, roll-formed sheet steel, extruded plastic and pultruded, glass-reinforced thermosetting resin.

12. A frame according to claim 10, in which each reinforcing channel is a unitary piece having a bend at approximately ninety degrees to form the first and second legs and a cross section of one of substantially U-shape and substantially Z-shape.

13. A frame according to claim 10, in which each reinforcing channel is one of plated steel and high strength plastic.

14. A frame according to claim 10, in which a cross section of each reinforcing channel is significantly smaller than a cross section of the hollow interior portions of the segments of screen bar for allowing the foamed chemical, prior to curing, to pass between the reinforcing channel and surfaces of the hollow interior portions.

15. A frame according to claim 10, further comprising a wheel mechanism secured to a respective first leg of each reinforcing channel, the wheel mechanism including a wheel for being guided in a track of the screen frame.

16. A frame according to claim 15, in which the center line of the wheel mechanism is aligned with the center line of the first legs of the reinforcing channel to which the wheel mechanism is secured.

17. A frame according to claim 15, further comprising decorative side panels for enclosing each wheel mechanism.

18. A frame according to claim 10, in which each of the segments of screen bar includes injection apertures, and the structural material is polyurethane foaming material having been injected into each of the segments through the injection apertures and solidified.

19. A method of making a screen bar corner reinforcement for use in strengthening frames, said method comprising:

providing at least a first segment and a second segment of screen bar, each being formed into a desired profile and each having a hollow interior portion;

providing a reinforcing channel having a first leg and a second leg arranged at approximately ninety degrees to the first leg;

inserting a portion of the first leg of the reinforcing channel through a first end of the first segment of the screen bar into and substantially spaced from all surfaces of the hollow interior portion of the first segment, the inserted portion of the reinforcing channel being sufficiently spaced from the surfaces of the hollow interior portion of the screen bar segment to allow foamed chemical, prior to curing, to pass between the inserted portion and the surfaces of the hollow interior portion;

inserting a portion of the second leg of the reinforcing channel through a first end of the second segment of the screen bar into and substantially spaced from all surfaces of the hollow portion of the second segment, the inserted portion of the reinforcing channel being sufficiently spaced from the surfaces of the hollow interior portion of the screen bar segment to allow foamed chemical, prior to curing, to pass between the inserted portion and the surfaces of the hollow interior portion; and selectively injecting, with a curable reinforcing and structural material, at least a portion of at least one of (i) the hollow interior portion of the first segment for securing the inserted portion of the first leg of the reinforcing channel therewithin and (ii) the hollow interior portion of the second segment for securing the inserted portion of the first leg of the reinforcing channel therewithin.

20. A method according to claim 19, in which each of the first and second segments of screen bar have a recess for securing screen therein and are made of a material selected from the group consisting of extruded aluminum, roll-formed aluminum, roll-formed sheet steel, extruded plastic and pultruded, glass-reinforced thermosetting resin.

21. A method according to claim 19, in which the reinforcing channel is a unitary piece having a bend at approximately ninety degrees to form the first and second legs and a cross section of one of substantially U-shape and substantially Z-shape.

22. A method according to claim 19, in which the reinforcing channel is one of plated steel and high strength plastic.

23. A method according to claim 19, in which a cross section of the reinforcing channel is significantly smaller than a cross section of the hollow interior portions of the first and second segments of screen bar for allowing the foamed chemical, prior to curing, to pass between the reinforcing channel and surfaces of the hollow interior portions.

24. A method according to claim 19, further comprising securing a wheel mechanism to one of the first and second legs of the reinforcing channel, the wheel mechanism including a wheel for being guided in a track of the screen frame.

25. A method according to claim 24, further comprising aligning the center line of the wheel mechanism with the center line of the one of the first and second legs of the reinforcing channel to which the wheel mechanism is secured.

26. A method according to claim 24, further comprising enclosing the wheel mechanism with decorative side panels.

27. A method according to claim 19, in which the first and second segments of screen bar each include injection apertures, and the structural material is polyurethane foaming material which is injected in said injecting steps into the first and second segments through the injection apertures and cured.

28. A method of making a screen frame including screen bar corner reinforcements, said method comprising:

providing first and second short segments of screen bar and first and second long segments of screen bar, each segment being formed into a desired profile and each having a hollow interior portion;

providing four reinforcing channels, each having a first leg and a second leg arranged at approximately ninety degrees to the first leg;

inserting a portion of the first leg of a respective reinforcing channel through an end of a short segment of the screen bar into and substantially spaced from all surfaces of the hollow interior portion of the short segment, the inserted portion of the reinforcing channel being sufficiently spaced from the surfaces of the hollow interior portion of the screen bar segment to allow foamed chemical, prior to curing, to pass between the inserted portion and the surfaces of the hollow interior portion;

inserting a portion of the second leg of a respective reinforcing channel through an end of a long segment of the screen bar into and substantially spaced from all surfaces of the hollow interior portion of the long segment, the inserted portion of the reinforcing channel being sufficiently spaced from the surfaces of the hollow interior portion of the screen bar segment to allow foamed chemical, prior to curing, to pass between the inserted portion and the surfaces of the hollow interior portion; and selectively injecting, with a curable reinforcing and structural material, at least a portion of at least one of (i) the hollow interior portions of the short segments for securing respective inserted portions of the first legs of the reinforcing channels therewithin and (ii) the hollow interior portions of the long segments for securing respective inserted portions of the second legs of the reinforcing channels therewithin.

29. A method according to claim 28, in which each of the segments of screen bar have a recess for securing screen therein and are made of a material selected from the group consisting of extruded aluminum, roll-formed aluminum, roll-formed sheet steel, extruded plastic and pultruded, glass-reinforced thermosetting resin.

30. A method according to claim 28, in which each reinforcing channel is a unitary piece having a bend at approximately ninety degrees to form the first and second legs and a cross section of one of substantially U-shape and substantially Z-shape.

31. A method according to claim 28, in which each reinforcing channel is one of plated steel and high strength plastic.

32. A method according to claim 28, in which a cross section of each reinforcing channel is significantly smaller than a cross section of the respective hollow interior portions of the segments of screen bar for allowing the foamed chemical, prior to curing, to pass between the reinforcing channel and surfaces of the hollow interior portions.

33. A method according to claim 28, further comprising securing a wheel mechanism to a respective first leg of each reinforcing channel, the wheel mechanism including a wheel for being guided in a track of the screen frame.

34. A method according to claim 33, further comprising aligning the center line of the wheel mechanism with the center line of a respective leg of the reinforcing channel to which the wheel mechanism is secured.

35. A method-according to claim 33, further comprising enclosing the wheel mechanism with decorative side panels.

36. A method according to claim 28, in which each segment of screen bar includes injection apertures, and the structural material is polyurethane foaming material which is injected in said injecting steps into each of the segments through the injection apertures and cured.

* * * * *